United States Patent [19]
Lloyd et al.

[11] 3,944,295
[45] Mar. 16, 1976

[54] TOWING VALVE ARRANGEMENT FOR FAIL-SAFE BRAKE SYSTEM

[75] Inventors: Michael K. Lloyd, Sandy City, Utah; Paul C. Rosenberger, Decatur, Ill.

[73] Assignee: Caterpillar Tractor Co., Peoria, Ill.

[22] Filed: Jan. 30, 1975

[21] Appl. No.: 545,642

[52] U.S. Cl. .................................. 303/89; 180/114
[51] Int. Cl.² ......................................... B60T 17/16
[58] Field of Search ....... 180/114; 188/265; 248/12, 248/16, 23; 303/71, 85, 89

[56] References Cited
UNITED STATES PATENTS

| 273,889 | 3/1883 | Platt | 188/265 X |
| 1,188,853 | 6/1916 | Sorenson | 188/265 UX |
| 2,963,896 | 12/1960 | Hoffman | 180/114 X |
| 3,107,126 | 10/1963 | Valentine | 303/71 X |
| 3,871,475 | 3/1975 | Stevenson et al. | 180/114 X |

*Primary Examiner*—Duane A. Reger
*Attorney, Agent, or Firm*—Phillips, Moore, Weissenberger Lempio & Strabala

[57] ABSTRACT

A brake system having spring applied fluid pressure released brakes is provided with an auxiliary source of pressure for release of the brakes and a valve that is locked into an inoperative position effective to thereby render it tamper-proof.

9 Claims, 2 Drawing Figures

TOWING VALVE ARRANGEMENT FOR FAIL-SAFE BRAKE SYSTEM

BACKGROUND OF THE INVENTION

The present invention relates to brake control systems and pertains particularly to a tamper-proof secondary control system for a fail-safe brake system.

Many large vehicles, especially earthmoving vehicles, employ fail-safe brake systems wherein the brakes are spring applied and fluid pressure released. Upon failure of the fluid pressure, the brakes are automatically applied and the vehicle cannot be moved until an auxiliary source of pressure is made available to release the brakes.

Some vehicles are provided with an auxiliary system so that the operator is merely required to shift a valve to move or continue operation of the vehicle for a short period of time. This arrangement allows the vehicle to be moved if necessary for repairs or the like. One problem with this arrangement is that vandals may open the auxiliary valve and move the vehicles or drain the auxiliary supply.

SUMMARY AND OBJECTS OF THE INVENTION

The primary object of the present invention is to overcome the aforementioned problems of the prior art.

Another object of the invention is to provide a tamperproof auxiliary control system for a fail-safe vehicle brake system.

A further object of the present invention is to provide an auxiliary brake control system with a valve that requires tools for shifting.

In accordance with the present invention, an auxiliary source of control fluid for a fail-safe brake system is provided with a valve that is locked in the "off" position and requires tools to be turned to the "on" position to render the system operative.

BRIEF DESCRIPTION OF THE DRAWINGS

The above and other objects and advantages of the present invention will become apparent from the following description when read in conjunction with the drawings wherein.

DETAILED DESCRIPTION OF PREFERRED EMBODIMENT

Figure 1:
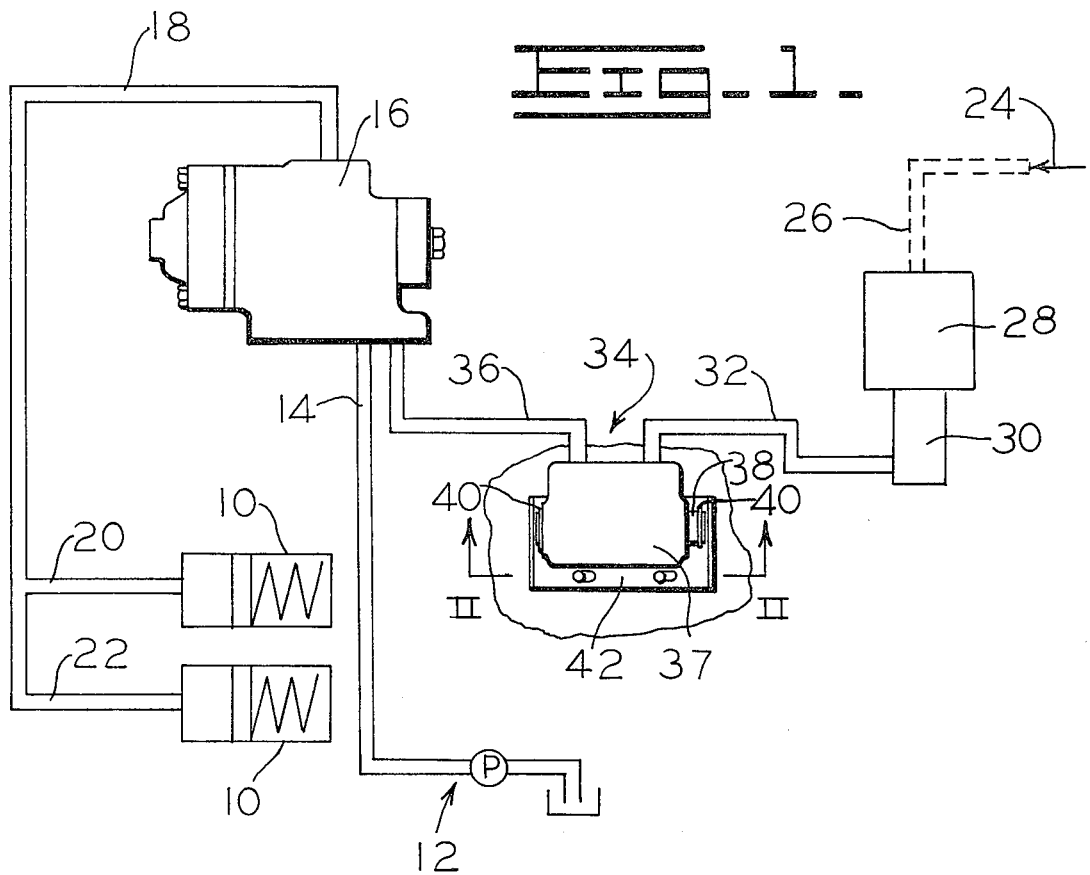
FIG. 1 is a schematic layout of a brake control system embodying the present invention.

Referring now to the drawings, particularly FIG. 1, there is illustrated a brake control system of the type having a plurality of fail-safe brake mechanisms 10 of the type that is spring applied and fluid pressure released. Such brake systems are well known and typically applied to large heavy-duty vehicles and are such that the brake system is operative to lock the wheels of a vehicle and prevent movement thereof until sufficient brake or control pressure is developed in the control system to release the brakes.

Such systems are typically known as "fail-safe" brake systems and normally operate automatically upon failure of control pressure within the system to apply the brakes to the vehicle to stop it. The system includes a primary source 12 of fluid pressure which is communicated by suitable conduit means 14 to a brake control valve 16 which is operated to direct the fluid by way of conduit 18 and branch conduits 20 and 22 for controllably releasing the brake mechanisms 10. The primary source of fluid 12 may be any suitable source such as the transmission control fluid or it may be implement control and actuating fluid.

An auxiliary control system is provided for supplying pressurized fluid for controlling the brake system should the primary system fail. The auxiliary system is provided so that the vehicle may be moved in the event of such primary system failure to secure maintenance or to move the vehicle to a place of safety.

The auxiliary system of the present invention comprises a suitable secondary or auxiliary source 24 of pressurized fluid which is supplied by way of suitable conduit means 26 to a suitable valve mechanism 28 which may be an air-operated valve or cylinder operating on or actuating a retarder cylinder mechanism 30. The auxiliary source 24 may be any suitable source such as the vehicle air system source having a storage tank to retain and supply air for operation of the auxiliary control system.

The cylinder 30 is operative to supply pressurized oil or hydraulic fluid by way of a conduit 32 to an auxiliary or diverter valve 34 which is operative to control communications by way of a conduit 36 with the brake control valve 16.

The auxiliary valve 34 comprises a housing 37 having a bore therein (not shown) and a valve spool 38 reciprocally mounted in the bore for controlling communication between conduits 32 and 36. The valve spool 38 may be of any suitable construction to define a two-position valve, providing a communicating position and a non-communicating position. These two positions would normally correspond in the present case to the extreme end positions of the valve spool 38. Mounted on the outer end of each end of the spool 38 is a stop ring 40 to define the outermost extreme position of the valve spool.

The valve 34 is provided with suitable locking means in the form of a bracket 42 which is shaped to define a substantially U-shaped configuration having a pair of upstanding like portions 44 and 46 which are operative to engage both ends of the valve spool 38. The bracket 42 is mounted in each illustrated embodiment directly beneath the valve 34 and includes a pair of slots 48 and 50 in which is engaged a pair of cap screws 52 and 54. The base of the bracket need not be clamped beneath the base of the valve body, but may be clamped to one side or on top of the body base. The locking bracket may not need both legs but can function with a single blocking member when it is desired to lock the valve in a single position.

These cap screws 52, 54 and slots 48, 50 cooperate to define the extreme outer positions of the valve spool 38. The cap screws 52 and 54 are operative upon being tightened down by a suitable wrench to lock the valve 34 in its selected communicating or non-communicating positions.

Figure 2:
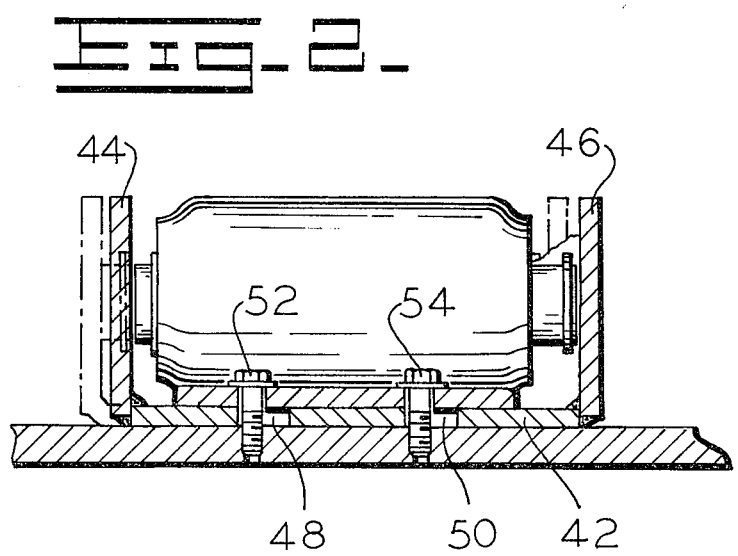
FIG. 2 is an elevational view of a preferred embodiment of the control valve of the present invention.

Thus, for example, when the bracket is moved to the extreme right position as shown in FIG. 2 to force the spool 38 to likewise be moved to its extreme right position, a non-communication position may be established. In this position, the cap screws 52 and 54 may be tightly secured to essentially lock the valve in the non-communicating position. Thus, it would require one to have wrenches available to loosen the screws 52 and 54 in order to shift the valve 34 into the operating position so that one may operate to release the brakes and move the vehicle.

The operating or communicating position of the valve 34 may be defined as the extreme left position shown in phantom in FIG. 2. Thus, with the valve 34 in its extreme right or blocking position, there is little danger of the auxiliary system being automatically, accidentally or maliciously brought into operation.

This locking system for a diverter valve may also be applied to other than brake systems. It may, for example, be applied to fuel systems to prevent an engine from starting. It may also be applied to hydraulic controls for implements and the like to prevent implements from being operated under certain conditions.

Other applications may be, for example, a system to alternately select one of two attachments with a single control valve circuit.

Thus, it is seen from the above description that we have provided a fail-safe brake system with auxiliary control means that is essentially tamper-proof. The system includes a lockable auxiliary valve that prevents the auxiliary system from being operated without the use of special tools or the like.

While the present invention has been illustrated and described with respect to a single embodiment, it is to be understood that numerous changes and modifications may be made therein without departing from the spirit and scope of the present invention as defined in the appended claims.

What is claimed is:

1. A vehicle brake control system having spring applied brake means and fluid pressure responsive release means;
    a brake control valve for controlling said brakes;
    a primary source of fluid pressure for controlling said brakes;
    an auxiliary source of fluid pressure for controlling said brakes upon failure of said primary source;
    an auxiliary control valve comprising a valve body, a valve spool reciprocably mounted in said valve body and movable between a communicating position and a noncommunicating position, for controlling communication of said auxiliary source with said control valve, both ends of said valve extending from said valve body; and,
    locking means including a bracket operative to engage both ends of said spool and adapted to be secured in a fixed position to block movement of said spool to said communicating position.

2. The brake control system of claim 1 wherein said bracket is slidable between two extreme positions to define said communicating and non-communicating positions.

3. The brake control system of claim 2 wherein said bracket is a U-shaped bracket engaging both ends of said spool.

4. A fluid control system for operating a fluid responsive motor;
    a main control valve for controlling said motor;
    a primary source of fluid pressure for operating said motor;
    an auxiliary source of fluid pressure for operating said motor upon failure of said primary source;
    an auxiliary control valve comprising a valve body, a valve spool reciprocably mounted in said valve body and movable between a communicating position and a noncommuicating position for controlling communication of said auxiliary source with said control valve, said valve spool having both ends extending from said valve body; and,
    locking means including a bracket, said bracket being operative to engage both ends of said spool and adapted to be secured in a fixed position to block movement of said spool to said communicating positon.

5. The brake control system of claim 4 wherein said bracket is slidable between two extreme positions to define said communicating and non-communicating positions.

6. The brake control system of claim 5 wherein said bracket is a U-shaped bracket engaging both ends of said spool.

7. A safety control valve for operating a fluid system comprising:
    a control valve having a communicating position and a noncommunicating position;
    a control valve comprising a valve body, a valve spool reciprocably mounted in said valve body and movable between a communicating position and a noncommunicating position, for controlling communication of fluid from a source, said valve spool extending from both ends of said valve body; and,
    locking means including a bracket, said bracket being operative to engage both ends of said spool and adapted to be secured in a fixed position to block movement of said spool from a selected one of said communicating and noncommunicating positions.

8. The control valve of claim 7 wherein said bracket is slidable between two extreme positions to define said communicating and non-communicating positions.

9. The control valve of claim 8 wherein said bracket is a U-shaped bracket engaging both ends of said spool.

* * * * *